United States Patent [19]

Behrmann et al.

[11] Patent Number: 5,337,389
[45] Date of Patent: Aug. 9, 1994

[54] FOCAL PLANE ARRAY MOUNT FOR A FIBER OPTIC DETECTOR SYSTEM AND RELATED METHOD OF ASSEMBLY

[75] Inventors: Gregory P. Behrmann, Columbia; Dale Smith, Baltimore; William Potter, W. Bethesda, all of Md.

[73] Assignee: The United States of America as represented by the Secretary of the Army, Washington, D.C.

[21] Appl. No.: 69,811

[22] Filed: Jun. 1, 1993

[51] Int. Cl.⁵ .............................. G02B 6/42
[52] U.S. Cl. ........................ 385/77; 385/54; 385/75; 385/86; 385/89; 385/92; 385/136; 385/137; 385/139
[58] Field of Search .............. 385/53, 54, 55, 56, 385/58, 59, 69, 75, 76, 77, 135, 136, 137, 139, 88, 89, 92, 86

[56] References Cited

U.S. PATENT DOCUMENTS

| | | | |
|---|---|---|---|
| 3,951,514 | 4/1976 | Medina, Jr. | 385/54 |
| 4,217,030 | 8/1980 | Howarth | 385/59 |
| 4,690,492 | 9/1987 | Beard | 385/89 |
| 4,772,086 | 9/1988 | Bellerby et al. | 385/89 |
| 5,078,515 | 1/1992 | Soulard et al. | 385/89 |
| 5,091,991 | 2/1992 | Briggs et al. | 385/82 |
| 5,134,673 | 7/1992 | Stephenson et al. | 385/56 |

OTHER PUBLICATIONS

*Optical Engineering*, vol. 25, No. 10, Oct. 1986, Cover and pp. 1076, 1082.

*Primary Examiner*—Frank Gonzalez
*Attorney, Agent, or Firm*—Freda L. Krosnick; Frank J. Dynda

[57] ABSTRACT

A mount for supporting a silicon v-groove array that contains delicate optical fibers. Optical fibers are arranged in a planar silicon v-groove array to form a focal plane array, which is connected to a first L-bracket. The focal plane array and the first L-bracket combination are attached to a second L-bracket via a shock/vibration isolation pad. The second L-bracket includes an extended cylinder which is threaded so that a strain relief can be screwed directly into the second L-bracket and the fibers extending out the first L-bracket can be fed through the second L-bracket and directly into a monocoil. The second L-bracket also includes space to attach front, side and top covers over the focal plane array. In a related method, the silicon v-groove array is epoxied to the first L-bracket. After preparation of the focal plane array, e.g. polishing of the fibers, is completed, the focal plane array/first bracket combination is connected to the second L-bracket, with the pad therebetween. The covers are then attached to the L-bracket.

18 Claims, 4 Drawing Sheets

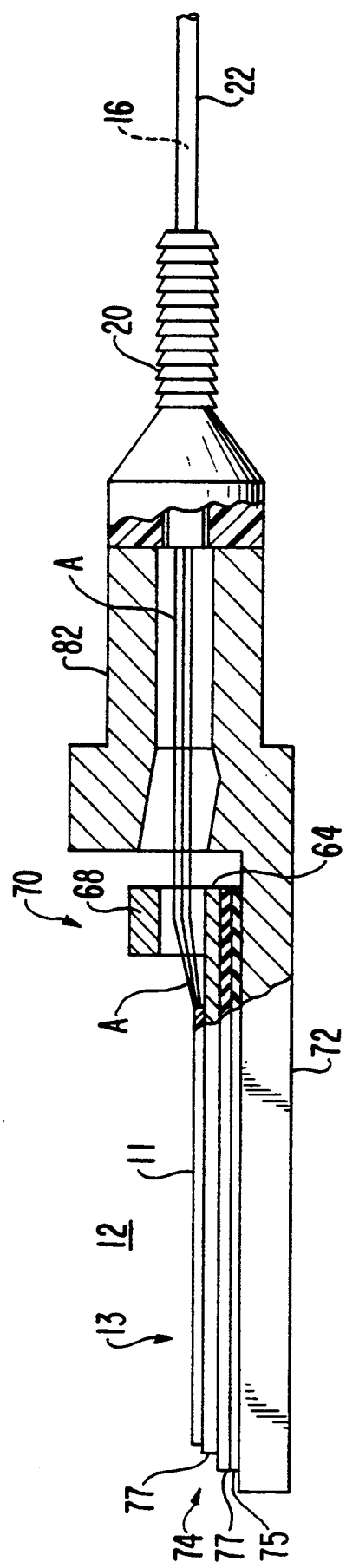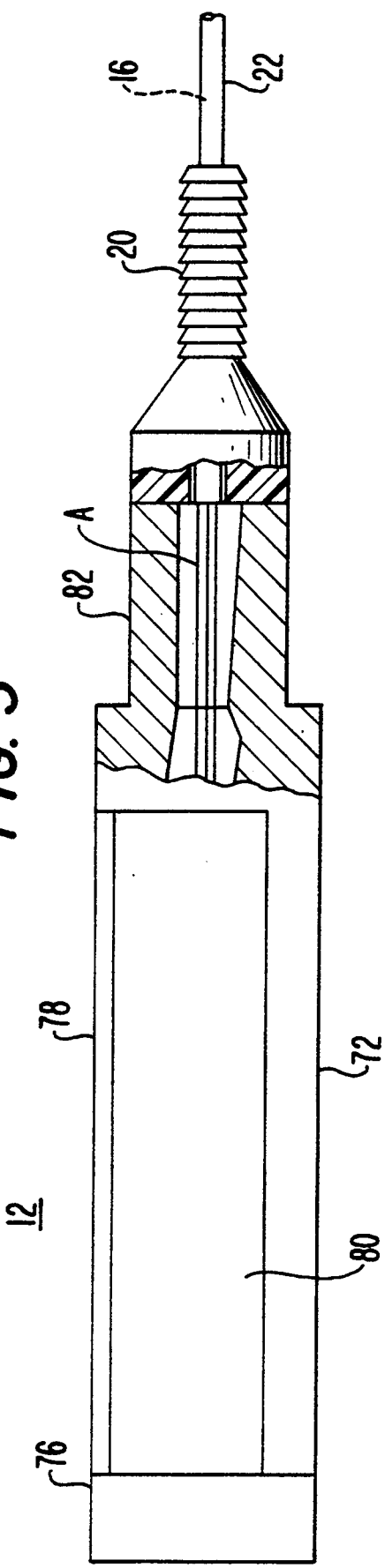

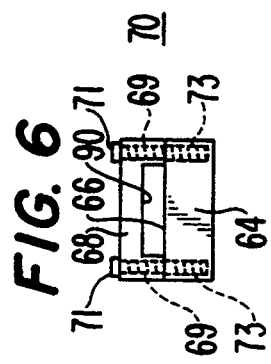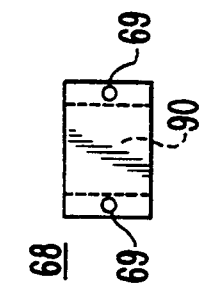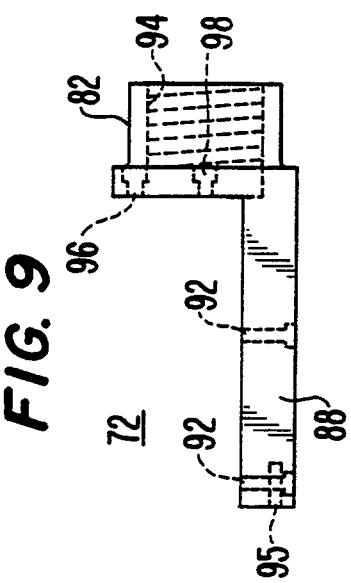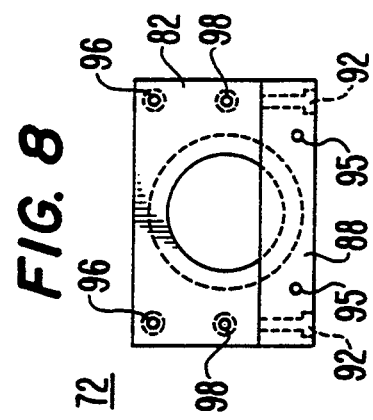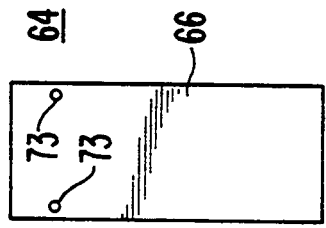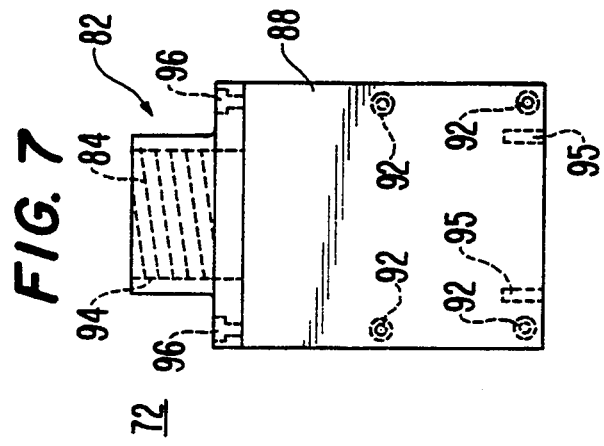

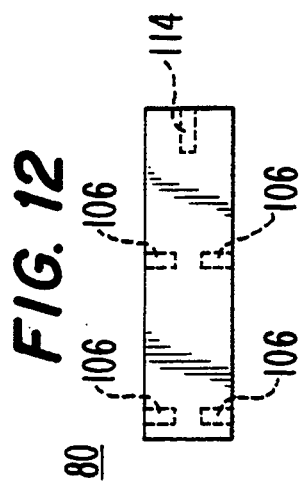
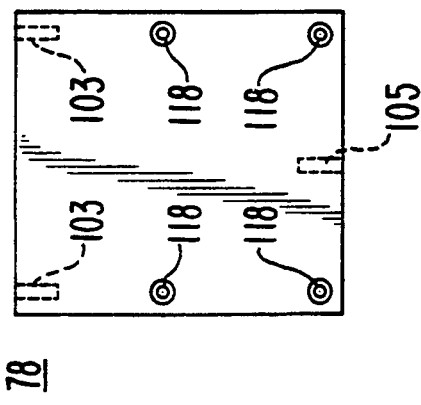
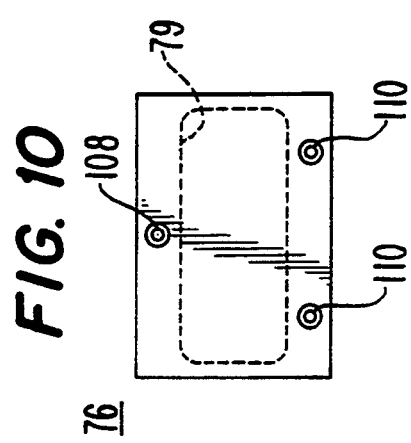

FOCAL PLANE ARRAY MOUNT FOR A FIBER OPTIC DETECTOR SYSTEM AND RELATED METHOD OF ASSEMBLY

BACKGROUND OF THE INVENTION

1. Field of the Invention

This invention relates to orienting delicate optical fibers and, more particularly, to a mount used in a fiber optic detector system for supporting, protecting, and providing strain relief for an array of optical fibers, and a method for manufacturing the mount.

2. Background Art

A fiber optic detector system is capable of detecting light intensity and modulation. At a first end of the system, small tightly packed optical fibers are arranged linearly and horizontally in a frame known as a silicon v-groove array. The silicon v-groove array with the fibers therein is known as a focal plane array.

Silicon v-groove arrays are common in many optoelectronic architectures. These arrays are delicate and mounting thereof is a critical issue in system design.

Light enters the small diameter, arrayed fibers and travels therethrough to a first half of an optical fiber connector. The light then enters a corresponding number of larger diameter fibers located in a second half of the connector, and travels to an amplifying detector at a second end of the system.

The detector includes a plurality of detector cards, each having a plurality of detector cans mounted on a PC board or similar mount. The larger fibers are pigtailed into the detector cans and are precisely positioned over a photodiode. The detector gives off a voltage representative of the light intensity and modulation received at the first end of the system, thereby allowing the user to measure these parameters.

Such a system usually is used in a laboratory tool that is handled roughly. Although the silicon v-groove array allows for precise alignment of optical fibers, it is too fragile to be subjected to the stresses of a laboratory environment. Daily movement, contact, dust, etc., can damage the system, especially the focal plane array.

In addition, there is a specific sequence of steps necessary for manufacturing the focal plane array, i.e. placing the optical fibers into the respective v-grooves, and processing the fibers, e.g. cutting and polishing the fibers. These techniques are well known. See for example, Bendow B. and Mitra S. S., *Fiber Optics*, Plenum Press, New York, 1979, pp. 450–454, or Personick S. D., *Fiber Optics: Technology and Applications*, Plenum Press, New York, 1985, pp. 39–40. In addition, fiber optic cable vendors often recommended how to prepare the ends of a fiber. There are many commercial cutting tools, polishing wheels, and accessories available, to perform these steps. Such processing, however, is time consuming, increases costs and frustrates efforts to create an easy to use mount for the focal plane array.

SUMMARY OF THE INVENTION

Accordingly, it is a purpose of the present invention to provide a mount which safely supports a focal plane array.

It is another purpose of the present invention to provide a mount that ruggedly protects optical fibers mounted therein.

It is another purpose of the present invention to provide a focal plane array mount which reliably supports a silicon v-groove array containing delicate optical fibers.

It is another purpose of the present invention to provide a fiber optic array mount that protects the silicon v-groove array and fibers received therein from shock and vibration, covers the silicon v-groove array and fibers to prevent destructive contact and dust infiltration, and provides strain relief to the optical fibers received in the silicon v-groove array.

It is another purpose of the present invention to provide a focal plane array mount that allows adequate support of optical fibers while not interfering with steps involved in the fabrication of the focal plane array.

Finally, it is another purpose of the present invention to provide a method of manufacturing a focal plane array and associated protective mount that is relatively easier and more reliable than prior art methods.

To achieve the foregoing and other purposes of the present invention there is provided a mount for supporting a focal plane array. The main components of the mount include a first L-bracket, a second L-bracket, a front cover, a top cover, left and right side covers, a strain relief, and a shock/vibration isolation pad.

Optical fibers are arranged in a planar silicon v-groove array to form the focal plane array, which is connected substantially parallel to the first L-bracket. The fibers extend through a portion of the first L-bracket. The focal plane array and the first L-bracket combination are then attached substantially parallel to the second L-bracket. The second L-bracket is much larger and more rugged than the first L-bracket, giving the focal plane array the necessary support and strain relief.

Shock and vibration isolation is achieved by placing a shock/vibration isolation pad between the first and second L-brackets.

The second L-bracket includes an integral extended cylinder which is threaded so that the strain relief can be screwed directly therein, and the fibers extending out of the first L-bracket can be fed through the second L-bracket and directly into a monocoil.

The second L-bracket also includes areas to attach the front, side, and top covers around the focal plane array.

The mount protects the silicon v-groove array and fibers during manufacturing, shipping, laboratory use, and routine maintenance.

According to the method, the silicon v-groove array is first connected to the first L-bracket. The fibers are passed through the second L-bracket, which is not yet connected to the first L-bracket, and then through the first L-bracket to form the focal plane array. Final processing of the focal plane array (i.e. gluing, cutting, curing and polishing of the fibers) takes place while the focal plane array is glued to the first L-bracket.

When preparation of the focal plane array is completed, it is glued to the second L-bracket, with the shock/vibration isolation pad therebetween. The covers are then attached to the first and second L-brackets.

This method facilitates and improves quality production of the focal plane array because the focal plane array is adequately supported by the first L-bracket of the mount for the purposes of the final preparation steps, but the first L-bracket does not inhibit these steps.

Other features and advantages of the present invention will be apparent from the following description taken in conjunction with the accompanying drawings,

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a left side view of the focal plane array mount according to the present invention with the side, front and top covers removed.

FIG. 3 is a left side view of the focal plane array mount with the side, front and top covers attached.

FIG. 4 is a top view of a first piece of a first L-bracket of the mount according to the present invention.

FIG. 5 is a top view of a second piece of the first L-bracket.

FIG. 6 is a front view of the first and second pieces connected to form the first L-bracket.

FIG. 7 is a top view of a second L-bracket of the mount according to the present invention.

FIG. 8 is a front view of the second L-bracket.

FIG. 9 is a left side view of the second L-bracket.

FIG. 10 is a front view of a front cover of the mount.

FIG. 11 is a top view of a top cover of the mount.

FIG. 12 is a left side view of a left side cover of the mount.

DESCRIPTION OF THE PREFERRED EMBODIMENTS

Figure 1:
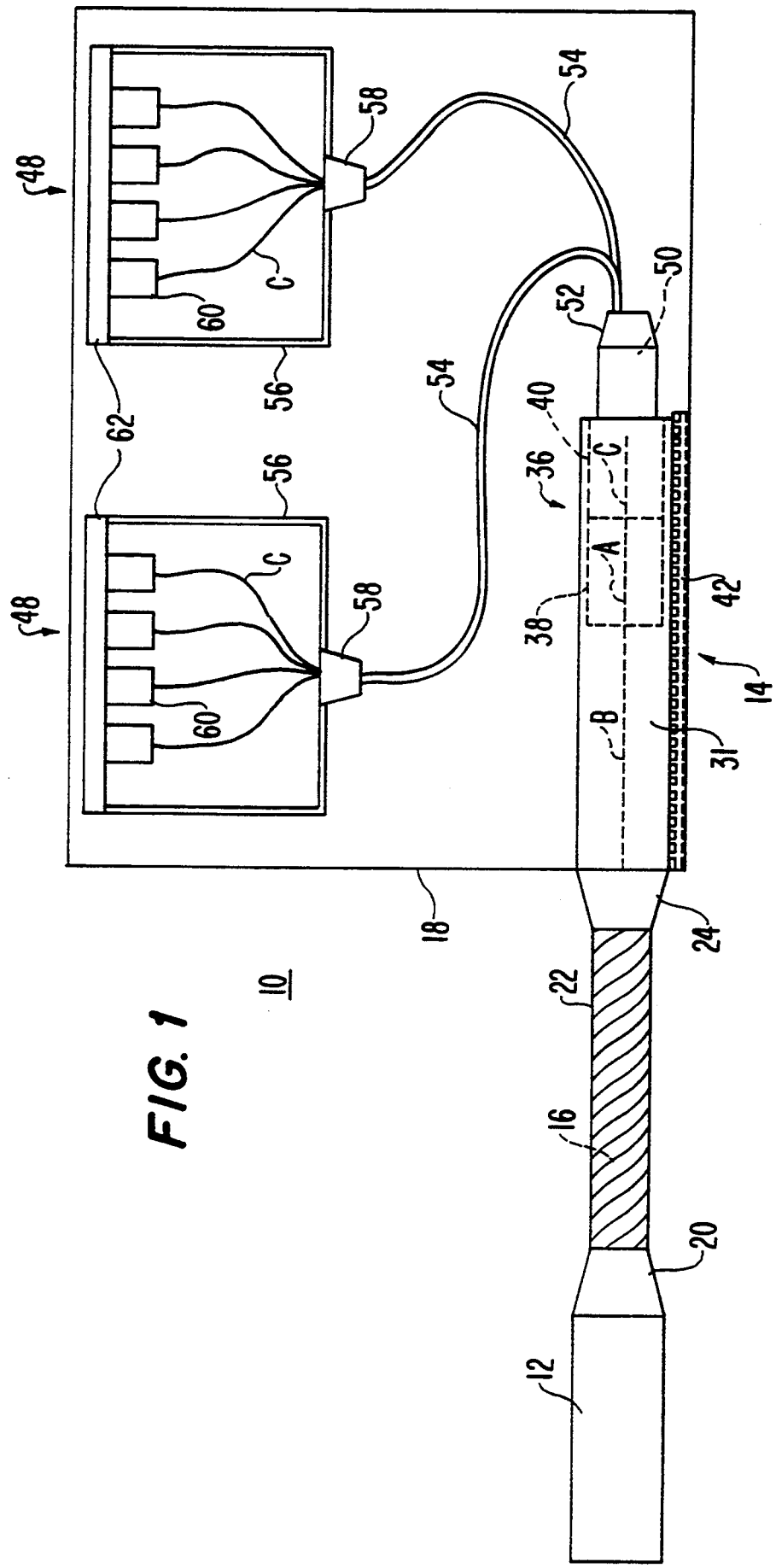
FIG. 1 is a schematic view of a fiber optic detector system using a focal plane array mount according to the present invention, for a five hundred and twelve optical fiber array.

FIG. 1 is a schematic view of a fiber optic detector system 10, including a focal plane array mount 12 according to the present invention, a connector distribution assembly 14, a round cross-sectional bundle 16 of fibers, a chassis 18, and a plurality of detectors 48.

Referring specifically to FIGS. 2 and 3, in this embodiment a known frame support or silicon v-groove array 11 receives and arranges linearly and horizontally on an upper surface thereof, five hundred and twelve fibers A in respective v-grooves (not shown). Of course, only a small number of the fibers A is shown for clarity. This silicon v-groove array/fiber combination is referred to as the focal plane array 13. The fibers A are then transformed as described below into the bundle 16.

In FIG. 2, the side covers, front cover and top cover are removed from the mount 12 to expose interior aspects of the mount 12. In FIG. 3, the side covers, front cover and top cover are attached.

The main components of the mount 12 are a first L-bracket 70, a second L-bracket 72, a shock/vibration isolation pad 74, a front cover 76, a top cover 78, left and right side covers 80 (one shown), a strain relief 20, and a monocoil 22.

The strain relief 20, and the other strain reliefs described herein, are preferably plastic and allow gradual movement restriction of the fibers. These strain reliefs are available from, e.g., Heyco Molded Products of Kenilworth, N.J.

The monocoil 22, and the other monocoils described herein, are made of a wire wrap covered by vinyl to protect the fibers from crushing and extreme bending. Such a monocoil is available from many vendors.

FIG. 4 is a top view of a first piece 64 of the first L-bracket 70. This first piece 64 is a planar, rectangular member which receives on an upper surface 66 thereof a lower surface of the silicon v-groove array 11. This first piece 64 includes holes 73 for receiving screws 71 (FIG. 6).

FIG. 5 is a top view of a second piece 68 of the first L-bracket. The bottom of the second piece 68 includes an inset 90 which provides clearance to receive therethrough the fibers A extending from the focal plane array 13. The second piece 68 also includes holes 69 corresponding to the holes 73 so that the second piece 68 can be connected perpendicularly to the rear of the first piece 64 by the screws 71.

FIG. 6 is a front view illustrating the second piece 68 connected to the upper surface 66 of the first piece 64 via the screws 71 to form the first L-bracket 70.

After the focal plane array 13 is connected to the first bracket 70 by, e.g., epoxy, with the fibers A extending through the inset 90, the focal plane array 13 undergoes final processing or preparation as described below. The first L-bracket 70 is then connected to the second L-bracket 72 with the shock/vibration isolation pad 74 therebetween. The pad 74 is preferably made from two 1/16" thick rubber pads 75, 77.

FIGS. 7, 8 and 9 are top, front and left side views, respectively, of the second L-bracket 72. The second L-bracket includes a first front planar portion 88, and a preferably integral, extended, rear cylindrical portion 82 that serves as the strain relief 20 holder.

The second L-bracket 72 is larger than the first bracket 70 and has areas to attach the front cover 76, top cover 78 and side covers 80 thereto as shown in FIG. 3. More particularly, the planar portion 88 of the second L-bracket 72 includes holes 92 for passing screws (not shown) into lower holes 106 of the side covers 80, holes 95 for receiving screws (not shown) extending through holes 110 formed in the front cover 76, holes 96 for passing screws (not shown) into holes 103 formed in the top cover 78 and holes 98 for receiving screws (not shown) passing through holes 114 of the side covers 80. The front cover 76, top cover 78, and side covers 80 prevent dust from entering the mount 12 and protect the fibers A and silicon v-groove array 11 from damage.

The extended cylindrical portion 82 also includes a cylindrical opening 94 formed centrally therein which allows the fibers A to extend out of the mount 12. The cylindrical portion 82 of the second L-bracket 72 includes a thread 84. The similarly threaded strain relief 20 is screwed into the extended cylindrical portion 82 via the thread 84. This allows the fibers A from the focal plane array 13 to be fed through the extended cylindrical portion 82 and directly into the monocoil 22 which is already supported by the strain relief 20. This integrally formed extended cylinder 82 reduces the number of pieces required.

FIG. 10 is a front view of the front cover 76 of the mount 12. This cover 76 includes a hole 108 for passing a screw (not shown) into a hole 105 of the top cover 78, and the pair of holes 110 for connecting screws (not shown) to holes 95 in the second L-bracket 72. The cover 76 also includes an interior recessed area 79.

FIG. 11 is a top view of the top cover 78 of the mount 12. This cover 78 includes a plurality of holes 118 for receiving screws (not shown) that connect the top cover 78 to upper holes 106 formed in the side covers 80. The top cover 78 also includes holes 103 corresponding to holes 96 in the second L-bracket 72, and the hole 105 for connecting the top cover 78 to the hole 108 in the front cover 76.

FIG. 12 is a left side view of a left side cover 80 for the mount 12. Each side cover 80 is identical and includes the plurality of holes 106 for receiving screws (not shown) passed through the holes 92 of the second L-bracket 72 and holes 118 of the top cover 78 and a hole 114 corresponding to each second L-bracket hole 98.

The brackets 70, 72, and covers 76, 78, 80, can be made from e.g. 6061 aluminum, plastic, wood, etc.

The method according to the present invention for assembling the mount 12 including the silicon v-groove array 11 and fibers A will now be described.

The silicon v-groove array 11 is made via known lithographic techniques, and is then attached by epoxy to the first piece 64 of the first L-bracket 70. The second piece 68 of the first L-bracket 70 is then screwed onto the first piece 64.

The fibers A are first fed individually through the extend cylindrical portion 82 of the second L-bracket 72. The second L-bracket 72 is slid down the monocoil 22 away from the silicon v-groove array 11. The fibers A are then fed through the inset 90 between the first 64 and second 68 pieces of the first L-bracket 70. Next the ends of the fibers A are laid into the v-grooves and glued into place. When the glue has hardened, each fiber A is cut with a cleaving tool. Finally, the front face of the array 13 is polished on a polishing wheel. These steps could not take place in a bulky housing like the second L-bracket 72 alone.

Thus, the optical fiber final processing steps occur after the two pieces 64, 68 of the first L-bracket 70 are screwed together, but before the first L-bracket 70 is attached to the second L-bracket 72. The first L-bracket 70 then acts as a rigid support to protect the silicon v-groove array during the gluing, cutting, polishing steps.

It is important for these steps of preparation that there be slack in the fibers A. The present invention provides this slack.

During the curing stage particularly, downward pressure is necessarily applied to the focal plane array 13. Since at this point, the focal plane array 13 is mounted only on the first L-bracket 70, there is no need to support the heavier weight of a monocoil or strain relief, as would be necessary if only the conventional silicon v-groove array 11 were being used.

Polishing of the focal plane array 13 also requires that the face of the array 13 be pressed against a polishing wheel. Once again, since the focal plane array 13 is only on the first L-bracket 70, a closer, more uniform polish can be achieved.

This first L-bracket 70 provides support for the processing of the fibers A but is inadequate for final laboratory use. Therefore, when the focal plane array 13 is fully processed, it is attached to the second L-bracket 72. The second L-bracket 72 is more rugged and protects the array 13 in a laboratory environment.

More particularly, the focal plane array 13 and first L-bracket 70 combination are connected to the second L-bracket 72 with the shock/vibration isolation pad 74 therebetween. The pad 74 has already been formed from the two 1/16" thick rubber pads 75, 77, connected by a relatively flexible adhesive/epoxy- A more rigid adhesive/epoxy is preferably used to attach the first 70 and second L-brackets 72 to the pad 74.

Prior to this connection, the extended cylinder 82 has preferably been machined out of the same material as the second L-bracket 72. As noted above, the extended cylindrical portion 82 is formed hollow and threaded so that the strain relief 20 can be screwed directly therein. In this way, the fibers A from the focal plane array 13 can be fed through the second L-bracket 72 and directly into the monocoil 22 which is already supported by the strain relief 20.

This extended cylindrical portion 82 simplifies the manufacturing process. If the extended cylindrical portion 82 and the second L-bracket 72 were two separate pieces, additional strain would be placed on the fibers A until each piece were fastened together.

The bundle 16 exits the mount 12 through the strain relief 20 and the monocoil 22, and then enters the connector distribution assembly 14 via another strain relief 24. A preferred connector distribution assembly 14 for use with this invention is described in Applicant's co-pending U.S. patent application, mailed Apr. 28, 1993, and entitled "Connector Distribution Assembly for a Fiber Optic Detector System," the disclosure of which is expressly incorporated herein.

In brief summary of the connector distribution assembly 14 described in this co-pending application, the assembly 14 includes a plurality of connectors 36, each having first 38 and second 40 halves. Once inside the assembly 14, the fibers A are split into groups B of equal number fibers in a fan out area 31. Each group B of fibers A then enters the first half 38 of the connector 36 where the group B is transformed into a linear array of fibers A. The second half 40 of the connector 36 houses a corresponding linear array of larger diameter fibers C. The assembly 14 fixedly but removably holds the connectors 36 in place by set screws (not shown). Shock and vibration isolation is achieved by placing the assembly 14 on a shock/vibration isolation pad 42. The larger fibers C from each second half 40 of the connectors 36 are then transformed to a round bundle 50 that is directed via a strain relief 52 and monocoil 54 to a respective detector 48, each including a detector card 56 (only two shown for clarity). The fibers C are again strain relieved at the detector cards 56 by strain relief assemblies 58.

The strain relief assembly 58 for the detector card 56 can take the form of the one described in Assignee's co-pending U.S. patent application Ser. No. 08/039,736, mailed Mar. 29, 1993, entitled "Detector Card Strain Relief Assembly," the disclosure of which is expressly incorporated herein.

Once at a detector card 56 the fibers C are split up and individually enter respective detector cans 60 (only four shown in each detector card 56 for clarity). Each detector can 60 is mounted on a PC board or similar mount 62.

As can be seen from the above description, as part of a much larger system 10, the focal plane array mount 12 supports, protects, and provides strain relief to a very delicate linear array of fibers A and silicon v-grooves. Particularly, this two L-bracket design provides the required protection of the focal plane array 13 without interfering with manufacturing and assembly processes. A one-piece mount construction would provide inadequate protection or make it impossible to complete necessary cutting and polishing of the delicate optical fibers.

Additionally, the mount uses combinations of rigid and flexible epoxies to allow for the installation of a vibration/shock isolation pad.

A further significant feature is the extended rear cylindrical portion 82 for receiving a strain relief assembly. This extended cylinder reduces the number of pieces and simplifies the assembly process.

The foregoing is considered illustrative only of the principles of the invention. For example, discussed above is one preferred embodiment for five hundred and twelve fibers. The invention could also be used in a one hundred twenty-eight fiber system, or any other number of fibers, with modification relating only really to scale. All other features are the same. That is, the five hundred twelve version is made larger to accommodate the larger silicon array. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

We claim:

1. A mount for a fiber optic detector system, comprising:
   a first bracket;
   means for receiving a plurality of optical fibers; the plurality of optical fibers in an array, said means being connected to one surface of the first bracket with the plurality of optical fibers extending through a portion of the first bracket; and
   a second bracket connected to an opposite surface of the first bracket with the plurality of optical fibers extending through a portion of the second bracket wherein said mount further comprises a pad connecting the first and second brackets.

2. The mount as recited tin claim 1, further comprising:
   a strain relief connected to the second bracket and receiving the plurality of optical fibers extending through a portion of the second bracket therethrough.

3. The mount as recited in claim 2, wherein the second bracket comprises an L shaped bracket and wherein a short perpendicular section of said L shaped second bracket includes an opening for receiving the strain relief and the plurality of optical fibers extending through a portion of the second bracket therethrough.

4. The mount as recited in claim 1, further comprising means for adhering the first bracket to the pad, and the second bracket to the pad.

5. The mount as recited in claim 4, wherein the pad is made of a plurality of pads connected by second, relatively more flexible means for adhering.

6. The mount as recited in claim 1, further comprising a cover means, connected to the second bracket, for covering the means for receiving the plurality of optical fibers and a portion of said plurality of optical fibers, wherein the cover means includes a pair of side covers connected to the second bracket, a front cover connected to the second bracket, and a top cover connected to the side covers, front cover and second bracket.

7. A method for manufacturing a mount for a fiber optic detector system, comprising the steps of:
   forming a first bracket;
   forming means for receiving a plurality of optical fibers in an array;
   connecting said means to one surface of the first bracket with the plurality of optical fibers extending through a portion of the first bracket;
   processing the optical fibers;
   forming a second bracket;
   connecting the second bracket to the first bracket with the plurality of optical fibers extending through a portion of the second bracket; wherein the step of connecting the first and second brackets includes interposing a pad between the brackets.

8. The method as recited in claim 7, further comprising the step of:
   connecting a strain relief to the second bracket with the plurality of fibers extending through the strain relief.

9. The method as recited in claim 7, further comprising the step of adhesively connecting the brackets to the pad.

10. The method as recited in claim 7, further comprising the steps of forming and connecting a cover means to the second bracket for covering the means for receiving the plurality of optical fibers and a portion of the plurality of optical fibers extending through a portion of the second bracket, wherein the step of forming and connecting said cover means includes forming and connecting a pair of side covers to the second bracket, a front cover to the second bracket, and a top cover to the side covers, front cover and second bracket.

11. The method as recited in claim 7 wherein the second bracket is formed to include a substantially perpendicular extension having an opening for receiving the strain relief and the plurality of optical fibers.

12. A mount for a fiber optic detector system, comprising:
   a first bracket;
   a plurality of optical fibers;
   a frame connected to one surface of the first bracket with the plurality of optical fibers being mounted thereon and extending through a portion of the first bracket;
   a second bracket connected to an opposite surface of the first bracket with the plurality of optical fibers extending through a portion of the second bracket; and
   a pad connecting the first and second brackets.

13. The mount as recited in claim 12, further comprising:
   a strain relief connected to the second bracket and receiving the plurality of optical fibers therethrough.

14. The mount as recited in claim 13, wherein the second bracket includes a substantially perpendicular extension having an opening for receiving the strain relief and the plurality of optical fibers.

15. The mount as recited in claim 12, further comprising a cover connected to the second bracket around the frame and a portion of said plurality of optical fibers.

16. The mount as recited in claim 15, wherein the cover includes a pair of side covers connected to the second bracket, a front cover connected to the second bracket, and a top cover connected to the side covers, front cover and second bracket.

17. The mount as recited in claim 12, further comprising an adhesive between the first bracket and the pad, and the second bracket and the pad.

18. The mount as recited in claim 17, wherein the pad is made of a plurality of pads connected by a second, relatively more flexible adhesive.

* * * * *